(12) United States Patent
Nakashima (10) Patent No.: US 7,676,150 B2
(45) Date of Patent: Mar. 9, 2010

(54) IMAGE PICKUP APPARATUS, IMAGE PICKUP METHOD AND IMAGE PICKUP PROGRAM

(75) Inventor: Teruyoshi Nakashima, Asaka (JP)

(73) Assignee: Fujifilm Corporation, Tokyo (JP)

( * ) Notice: Subject to any disclaimer, the term of this patent is extended or adjusted under 35 U.S.C. 154(b) by 786 days.

(21) Appl. No.: 11/482,072

(22) Filed: Jul. 7, 2006

(65) Prior Publication Data

US 2007/0019081 A1 Jan. 25, 2007

(30) Foreign Application Priority Data

Jul. 11, 2005 (JP) ............................. 2005-201995

(51) Int. Cl.
*G03B 17/00* (2006.01)
*H04N 5/232* (2006.01)

(52) U.S. Cl. .................................. 396/263; 348/211.9

(58) Field of Classification Search ................ 396/213, 396/263, 265; 348/211.9, 221.1, 222.1, 361, 348/362
See application file for complete search history.

(56) References Cited

U.S. PATENT DOCUMENTS 7,430,369 B2 * 9/2008 Fukui ........................... 396/78
2004/0218916 A1 * 11/2004 Yamaguchi et al. ......... 396/263

2008/0316319 A1 * 12/2008 Nomoto .................... 348/207.1

FOREIGN PATENT DOCUMENTS

JP 2001-51338 2/2001

* cited by examiner

*Primary Examiner*—Rodney E Fuller
(74) *Attorney, Agent, or Firm*—McGinn IP Law Group PLLC (57) ABSTRACT

An image pickup apparatus having a photographing condition setting section which sets photographing conditions of a subject, a photographing condition determination section which determines whether the image data in the storage section meet the photographing conditions set by the photographing condition setting section, and a photographing control section which deletes from the storage section image data determined by the photographing condition determination section not to meet the photographing conditions, and records into the recording section image data determined by the photographing condition determination section to meet the photographing conditions. In addition, the image data conversion section re-executes conversion of the picked-up image signals into image data and output of the image data.

25 Claims, 9 Drawing Sheets

| PHOTOGRAPHING CONDITION SETTINGS | | |
|---|---|---|
| FACIAL ORIENTATION | ☑ | FRONT |
| EYES | ☑ | HALF-OPEN INVALID |
| LINE OF SIGHT | ☑ | STRAIGHT INTO THE CAMERA |
| FACIAL EXPRESSION | ⦿ | DELIGHT |
| | ○ | ANGER |
| | ○ | SORROW |
| | ○ | PLEASURE |

| SUBJECT ID | NAME | REGISTERED FACIAL IMAGE |
|---|---|---|
| 1 | TARO FUJI | image001.jpg |
| 2 | HANAKO TAKAHASHI | image002.jpg |
| 3 | JIRO SUZUKI | image003.jpg |
| 4 | KAZUKO KATO | image004.jpg |
| 5 | SABURO YAMAMOTO | image005.jpg |
| ⋮ | ⋮ | ⋮ |

IMAGE PICKUP APPARATUS, IMAGE PICKUP METHOD AND IMAGE PICKUP PROGRAM

BACKGROUND OF THE INVENTION

1. Field of the Invention

The present invention relates to a technique for performing automatic photography based on photographing conditions.

2. Description of the Related Art

Conventionally, there have been techniques which determine whether a photographed image is adequate, and stores the image according to the result of the determination. For instance, a digital camera disclosed in Japanese Patent Application Laid-Open No. 2001-51338 comprises: a facial recognition device which recognizes the face of a subject based on image information; a determination device which determines, based on information from the facial recognition device, whether the face is turned towards a predetermined direction, whether the eyes are closed, or whether the line of sight is directed towards the camera; as well as a subject recording operation control device which performs recording operations of the subject based on the determination results of the determination device.

SUMMARY OF THE INVENTION

With the technique described in Japanese Patent Application Laid-Open No. 2001-51338, since image recording is performed after determination by image recognition, a time lag occurs between image recognition and photographing operation. As a result, because the orientation of the face may have deviated from a predetermined direction or the eyes may have been closed since by the time photographing commences, there is a possibility that an unsuccessful image will end up being recorded. The present invention has been made in consideration to such a problem, and its object is to perform photography through which images matching desired photographing conditions may be more reliably obtained.

In order to solve the above-described problem, an image pickup apparatus according to the present invention comprises: an image pickup element which receives subject light incident via a photographing lens, converts the subject light into a picked-up image signal, and outputs the signal; a image data conversion section which converts the picked-up image signal outputted by the image pickup element into image data and outputs the image data; a storage section which temporarily stores at least the image data outputted by the image data conversion section; a recording section which records the image data stored in the storage section; a photographing condition setting section which sets photographing conditions of a subject; a photographing condition determination section which determines whether the image data in the storage section meet the photographing conditions set by the photographing condition setting section; and a photographing control section which deletes from the storage section image data determined by the photographing condition determination section not to meet the photographing conditions, and records into the recording section the image data determined by the photographing condition determination section to meet the photographing conditions.

Until the photographing condition determination section determines that any of the image data stored in the storage section meets the photographing conditions, the photographing control section causes: the image pickup element to re-execute output of picked-up image signals; the image data conversion section to re-execute conversion of the picked-up image signals into image data and output of the image data; and the storage section to re-execute storing of the image data.

In the image pickup apparatus according to the present invention, image data temporarily stored in the storage section is determined as to whether it meets set photographing conditions, and the image data is recorded when found to meet the photographing conditions, while the image data is not recorded and is deleted when found not to meet the photographing conditions.

Conventionally, since recording is commenced when photographing conditions are met, a time lag occurs between the moment the photographing conditions are determined to be met and the moment when photographing commences. Therefore, there is no guarantee that an image actually recorded meets the photographing conditions.

However, in the image pickup apparatus according to the present invention, since fulfillment of photographing conditions is determined for recorded images, such occurrences will not occur, and it becomes possible to automatically select and record images matching desired photographing conditions.

In addition, photographing is repeated until an image data meeting the desired photographing conditions is obtained. Therefore, there is no more need to repeat the processes of photographing and image confirmation, thereby eliminating photographing failures due to image confirmation taking place instead of the shutter being released upon photographic opportunities.

The image pickup apparatus further comprises an interval setting section which sets a desired time interval, and for each desired time interval set by the interval setting section, the photographing control section causes: the image pickup element to re-execute output of picked-up image signals; the image data conversion section to re-execute conversion of the picked-up image signals into image data and output of the image data; and the storage section to re-execute storing of the image data.

Preferably, in response to the determination by the photographing condition determination section that any of the image data stored in the storage section meets the photographing conditions, the photographing control section deletes from the storage section image data not yet determined by the photographing condition determination section as to whether they meet the photographing conditions.

If image data meeting the photographing conditions have already been obtained, since other image data may be unnecessary, the photographing condition determination section may be arranged to abort determination to allow uniform deletion of other image data upon confirmation of the existence of image data meeting photographing conditions. In addition, the image pickup apparatus may be arranged to arbitrarily set whether this operation is to be performed.

The image pickup apparatus may further comprise: an identification information storage section which stores identification information of subjects; and an identification information selecting section which accepts selection of identification information of desired subjects. At the same time, the photographing condition determination section preferably determines whether any image data in the storage section meets the photographing conditions of a subject identified by desired identification information that is selected by the identification information selecting section.

This enables selection and recording of image data with a particular subject that meets photographing conditions, and is suitable for selecting image data in which a plurality of subjects are photographed.

Preferably, subject identification information is image data that is used as criteria for identifying the face of a subject. However, subject identification information may also be position information or the like.

In addition, the image pickup apparatus may further comprise a registration section which stores desired image data among the image data stored in the storage section, as subject identification information in the identification information storage section.

This enables determination of whether photographing conditions are met for a desired subject.

Furthermore, the image pickup apparatus may further comprises a display section which displays image data determined by the photographing condition determination section to meet photographing conditions.

While photographing conditions include the orientation of the face of the subject, whether eyes are open or closed, and line of sight or facial expression of the subject, photographing conditions are not limited to any particular conditions as long as such conditions are determinable based on values obtained from image data.

An image pickup method according to the present invention is an image pickup method used in an image pickup apparatus comprising: an image pickup element which receives subject light incident via a photographing lens, converts the subject light into a picked-up image signal and outputs the image signal; an image data conversion section which converts the picked-up image signal outputted from the image pickup element into image data and outputs the image data; a storage section which temporarily stores at least the image data outputted by the image data conversion section; and a recording section which records the image data stored in the storage section; wherein the image pickup method comprises: a setting step for setting photographing conditions of a subject; a determination step for determining whether the image data in the storage section meet the set photographing conditions; and a deleting and recording step for deleting from the storage section image data determined not to meet the photographing conditions, and recording to the recording section image data determined to meet the photographing conditions; and a re-executing step for causing, until any of the image data stored in the storage section is determined to meet the photographing conditions, the image pickup element to re-execute output of picked-up image signals, the image data conversion section to re-execute conversion of the picked-up image signals into image data and output of the image data, and the storage section to re-execute storing of the image data.

An image pickup program according to the present invention is an image pickup program used in an image pickup apparatus comprising: an image pickup element which receives subject light incident via a photographing lens and converts the subject light into a picked-up image signal and outputs the image signal; an image data conversion section which converts the picked-up image signal outputted from the image pickup element into image data and outputs the image data; a storage section which temporarily stores at least the image data outputted by the image data conversion section; a recording section which records the image data stored in the storage section; and a processing unit: wherein the image pickup program causes the processing unit to execute: a setting step for setting photographing conditions of a subject; a determination step for determining whether the image data in the storage section meet the set photographing conditions; and a deleting and recording step for deleting from the storage section image data determined not to meet the photographing conditions, and recording to the recording section image data determined to meet the photographing conditions; and a re-executing step for causing, until any of the image data stored in the storage section is determined to meet the photographing conditions, the image pickup element to re-execute output of picked-up image signals, the image data conversion section to re-execute conversion of the picked-up image signals into image data and output of the image data, and the storage section to re-execute storing of the image data.

According to the present invention, image data temporarily stored in the storage section is determined as to whether it meets set photographing conditions, and the image data is recorded when found to meet the photographing conditions, while the image data is not recorded and is deleted when found not to meet the photographing conditions. In addition, photographing is repeated until an image data meeting the desired photographing conditions is obtained. Therefore, automatic selection and recording of image data that meet desired photographing conditions becomes possible. In addition, the present invention eliminates the need to repeat the processes of photographing and image confirmation, and prevents occurrences of photographing failures due to image confirmation taking place instead of the shutter being released upon a photographic opportunity, thereby ensuring that images meeting photographing conditions are obtained.

DETAILED DESCRIPTION OF THE PREFERRED EMBODIMENTS

Preferred embodiments of the present invention will now be described with reference to the attached drawings.

Figure 1:
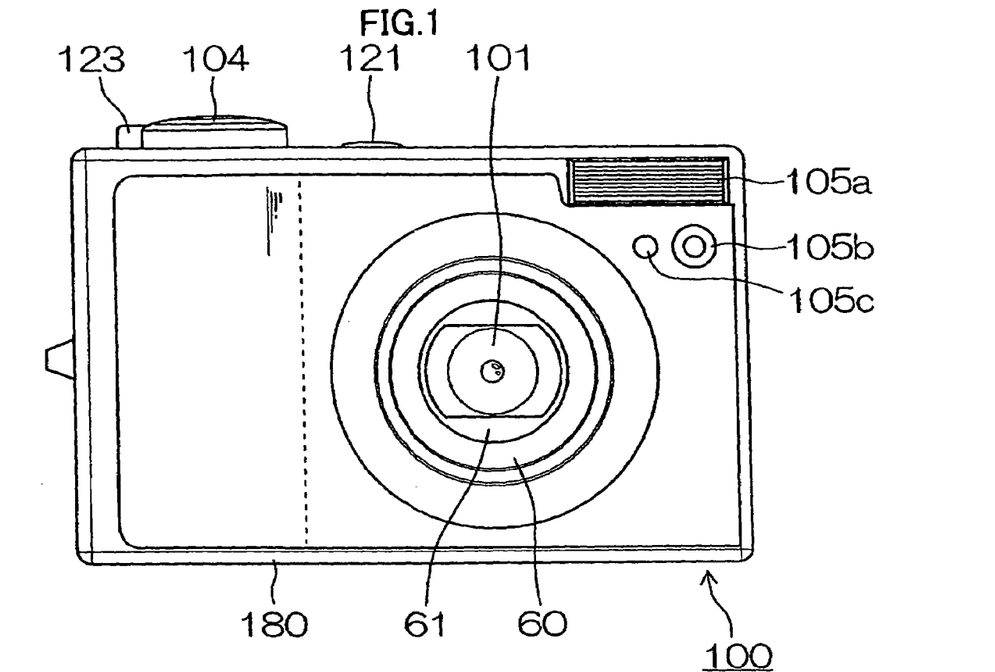
FIG. 1 is a front view of a digital camera.

FIG. 1 is a front view of a digital camera (hereinafter abbreviated as "camera") 100 according to a preferred embodiment of the present invention.

Figure 2:
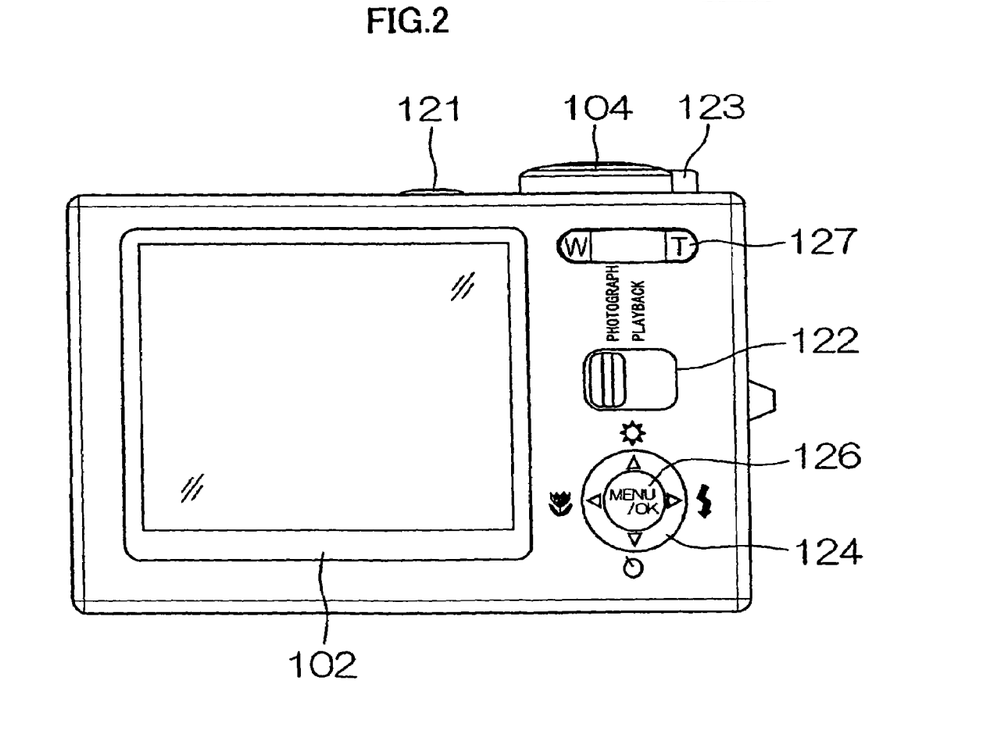
FIG. 2 is a rear view of a digital camera.

A photographing lens 101 which includes a zoom lens 101a and a focusing lens 101b (these lenses are shown in FIG. 2) is housed in a lens cone 60 deployed on a front face of the camera 100. Focal length adjustment is performed by moving the zoom lens 101a in the direction of an optical axis, while focus adjustment is performed by moving the focusing lens 101b in the direction of the optical axis.

From its retracted state in a camera body 180, the lens cone 60 extends out from and retracts back into the camera body 180 by moving back and forth between a wide end, which is a preset minimum focal length, and a tele end, which is a preset maximum focal length. The FIG. 1 shows the lens cone 60 retracted into the camera body 180.

The camera 100 is also provided with a lens cover 61 which covers the frontal face of the photographing lens 101 to create a protection state of the photographing lens 101 by secluding it from the outside during non-photographing mode, and exposes the photographing lens to the outside during photographing mode.

The lens cover 61 is configured with an openable and closable mechanism, and covers the frontal face of the photographing lens 101 in its opened state, while exposing the frontal face of the photographing lens 101 to the outside in its closed state. The lens cover 61 is opened/closed in conjunction with the turning on/off of a power switch 121. The FIG. 1 shows the lens cover 61 in its opened state.

A mode dial 123 provided with a release switch 104 at a central portion thereof and the power switch 121 are disposed on an upper face of the camera 100. A flash light emission tube 105a, an AF fill light lamp 105b, a self-timer lamp 105c and the like are disposed on the frontal face of the camera 100.

FIG. 2 is a rear view of the camera 100. A zoom switch 127 is disposed on the rear face of the camera 100. By pressing a tele (T) side of the zoom switch 127, the lens cone 60 extends out towards a tele-end (telephoto) side as long as the switch is pressed down. By pressing the wide (W) side of the zoom switch 127, the lens cone 60 moves towards a wide-end (wide angle) side as long as the switch is pressed down.

An image displaying LCD 102, a switching lever 122, a cross-shaped key 124, an information position specifying key 126 and the like are also provided on the rear face of the camera 100. The cross-shaped key 124 is an operation system in which up, down, left and right respectively set display brightness adjustment/self-timer/macro photography/flash photography. Although a description will be provided later, pressing the down key of the cross-shaped key 124 enables setting of a self photographing mode, where a main CPU 20 causes a CCD 132 to perform shutter operations after conclusion of a clocking operation by a self-timer circuit 83.

Figure 3:
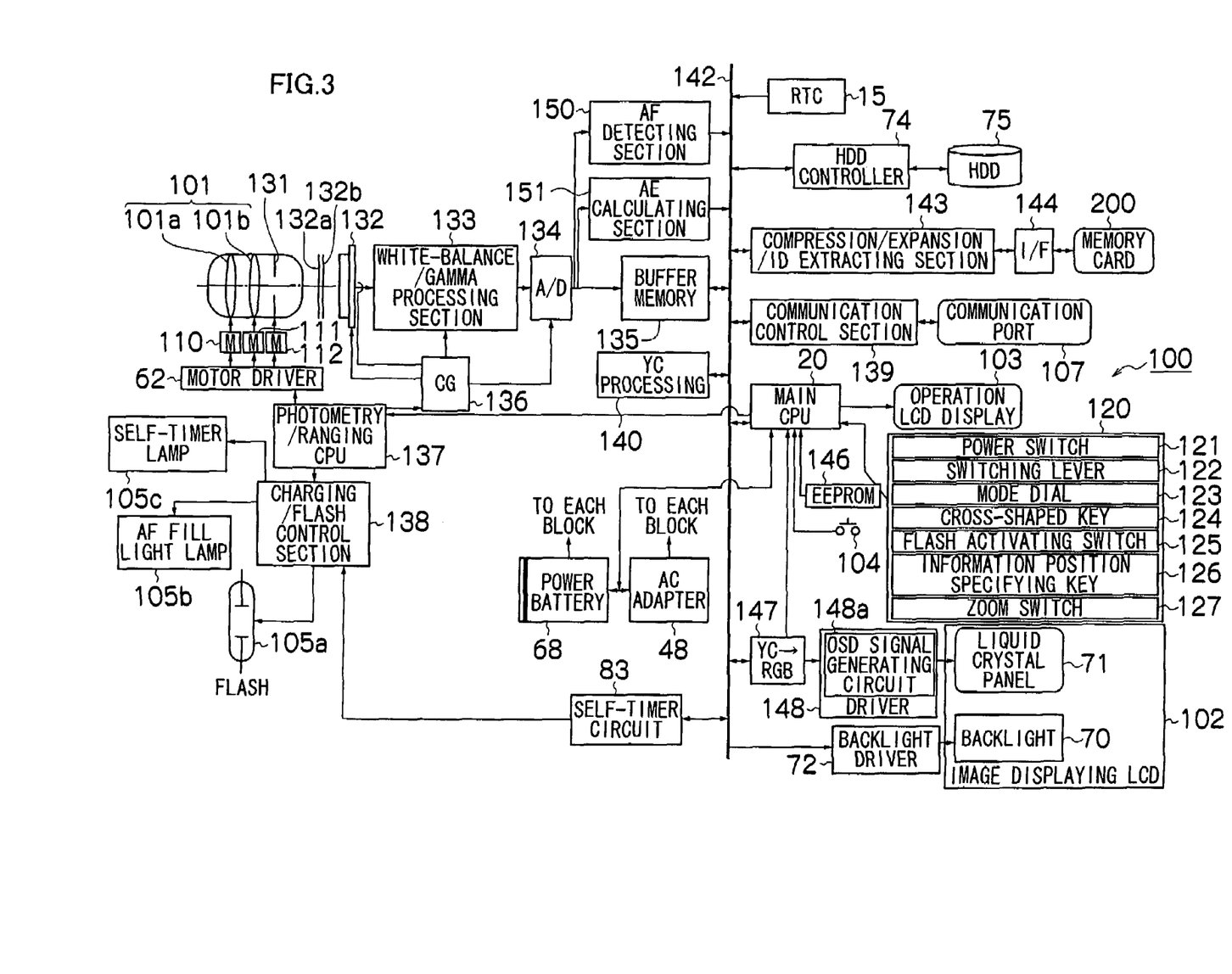
FIG. 3 is a block configuration diagram of a digital camera.

FIG. 3 is a block diagram of the camera 100. The camera 100 is provided with an operation section 120 which allows a user to perform various operations when using the camera 100. The operation section 120 comprises: the power switch 121 for turning on power to activate the camera 100; the switching lever 122 which allows arbitrary switching among photographing, playback, and list playback which will be described later; the mode dial 123 for selecting automatic photographing, manual photographing or the like; the cross-shaped key 124 for setting or selecting among various menus and for performing zoom; a flash activating switch 125; and the information position specifying key 126 for executing or canceling menus selected through the cross-shaped key 124.

The camera 100 also comprises: the image displaying LCD 102 for displaying photographed images, playback images or the like; and an operation LCD display 103 which provides assistance for operation.

The camera 100 is equipped with the release switch 104. Instructions to commence photographing are conveyed to the main CPU 20 by the release switch 104. In the camera 100, the switching lever 122 enables switching among photographing, playback, and the after-mentioned "list mode" to be performed arbitrarily. When photographing, the switching lever 122 is switched to its photographing side by the user. For playback, the switching lever 122 is switched to its playback side. For "list mode", the switching lever 122 is switched to its "list" side. In addition, the camera 100 is equipped with a flash light emission device comprising a flash light emission tube 105a which emits flash light.

The camera 100 also comprises the photographing lens 101 (including a zoom lens 101a and a focusing lens 101b), a diaphragm 131, and the CCD image sensor 132 (hereinafter abbreviated to "CCD 132") which is an image pickup element that converts subject images formed via the photographing lens 101 and the diaphragm 131 into analog image signals. More specifically, the CCD 132 creates image signals by accumulating electric charges generated by subject light irradiating the CCD 132 over a variable electric charge accumulation period (exposure period). An image signal for each frame is sequentially outputted from the CCD 132 at timings synchronized with vertical synchronizing signals VD outputted from a CG section 136.

In the case the CCD 132 is used as the image pickup element, an optical low-pass filter 132a which removes unnecessary high frequency elements from incident light is provided to prevent occurrences of false color signals and moiré fringes or the like. Also provided is an infrared cut filter 132b which absorbs or reflects infrared light in the incident light to correct the unique sensitivity characteristic of the CCD 132 which is sensitive in the long wavelength range. Disposition of the optical low-pass filter 132a and the infrared cut filter 132b is not limited to any particular aspect.

The camera 100 also comprises a white-balance/gamma processing section 133 which adjusts the white balance of a subject image represented by the analog image signal from the CCD image sensor 132, and adjusts the gradient (gamma) of a straight line in the tone characteristic of the subject image. The white-balance/gamma processing section 133 also includes an amplifier with variable amplification which amplifies the analog image signal.

The camera 100 further comprises an A/D section 134 which performs A/D conversion on the analog signals from the white-balance/gamma processing section 133 to convert into digital RGB image data, and a buffer memory 135 for storing the RGB data from the A/D section 134.

In the present embodiment, the A/D section 134 has a quantization resolution of 8 bits, and converts analog RGB picked-up image signals outputted from the white-balance/gamma processing section 133 into RGB digital image data with levels of 0 to 255 and outputs the converted data. However, the described quantization resolution is merely an example, and is not a value essential to the present invention.

The camera 100 also comprises the CG (clock generator) section 136, a photometry/ranging CPU 137, a charging/flash control section 138, a communication control section 139, a YC processing section 140, and a power battery 68.

The CG section 136 outputs vertical synchronizing signals VD for driving the CCD image sensor 132, drive signals including high-speed discharge pulses P, control signals which control the white-balance/gamma processing section 133 and the A/D section 134, and control signals which control the communication control section 139. In addition, control signals from the photometry/ranging CPU 137 is inputted to the CG section 136.

The photometry/ranging CPU 137 performs ranging by controlling a zoom motor 110, a focusing motor 111 and an aperture motor 112 which performs aperture adjustment to respectively drive the zoom lens 101a, the focusing lens 101b and the diaphragm 131, and controls the CG section 136 and the charging/flash control section 138. Driving of the zoom motor 110, the focusing motor 111 and the aperture motor 112 is controlled by a motor driver 62, and control commands for the motor driver 62 are sent from either the photometry/ranging CPU 137 or the main CPU 20.

When the release switch 104 is half-pressed (S1 is activated), the photometry/ranging CPU 137 performs photometry (calculation of EV values) of the brightness of the subject based on image data periodically (every 1/60th to 1/30th of a second) obtained from the CCD 132.

In other words, an AE calculating section 151 integrates the RGB signals outputted from the A/D conversion section 134, and provides the photometry/ranging CPU 137 with an integrated value. The photometry/ranging CPU 137 detects an average brightness of the subject (subject luminance) based on the integrated value inputted from the AE calculating section 151, and calculates an exposure value (EV value) suitable for photographing.

Based on the obtained EV value, the photometry/ranging CPU 137 then determines an exposure value which includes an aperture value (F value) of the diaphragm 131 and an electronic shutter (shutter speed) of the CCD 132 according to a predetermined program chart (AE operation).

When the release button 104 is fully pressed (S2 is activated), the photometry/ranging CPU 137 drives the diaphragm 131 based on the determined aperture value to control the aperture size of the diaphragm 131, and controls the electric charge accumulation period at the CCD 132 via the CG section 136 based on the determined shutter speed.

AE operations include aperture priority AE, shutter speed priority AE, and program AE. In any case, by measuring subject luminance and performing photographing using the exposure value, or in other words, the combination of aperture value and shutter speed determined based on the photometric value of the subject luminance, the image pickup apparatus is controlled so that image pickup is performed under an appropriate exposure, thereby eliminating troublesome exposure determination.

An AF detecting section 150 extracts from the A/D conversion section 134 image data corresponding to a detection range selected by the photometry/ranging CPU 137. The method used for detecting focus position utilizes a characteristic where the high frequency components of image data reach maximum amplitude at a focus position. The AF detecting section 150 calculates an amplitude value by integrating over one field period the high frequency components of the extracted image data. The AF detecting section 150 sequentially calculates amplitude values while the photometry/ranging CPU 137 controls driving of the focusing motor 111 and moves the focusing lens 101*b* within its range of movement, i.e. between the end point of the infinity side (INF point) and the end point of the near side (NEAR point), and when maximum amplitude is detected, transmits the detected value to the photometry/ranging CPU 137.

The photometry/ranging CPU 137 obtains the detected value, and instructs the focusing motor 111 to move the focusing lens 101*b* to a focus position corresponding to the detected value. In response to the instruction from the photometry/ranging CPU 137, the focusing motor 111 moves the focusing lens 101*b* to a focus position (AF operation).

The photometry/ranging CPU 137 is connected to the release switch 104 through inter-CPU communication with the main CPU 20, and detection of the focus position is performed when the release switch 104 is half-pressed by the user. The zoom motor 110 is also connected to the photometry/ranging CPU 137. When the main CPU 20 receives instructions to zoom in either a tele direction or a wide direction from the user through the zoom switch 127, the photometry/ranging CPU 137 drives the zoom motor 110 to move the zoom lens 101*a* between the wide end and the tele end.

In order to make the flash light emission tube 105*a* emit flash light, the charging/flash control section 138 receives power supplied from the power battery 68 to charge a capacitor for flash light emission, not shown, and controls flashing of the flash light emission tube 105*a*.

In response to the start of charging of the power battery 68, as well as the loading of various signals such as half-pressed operation signals and fully-pressed operation signals of the release switch 104 and signals indicating flash amount and flash timing from the main CPU 20 or the photometry/ranging CPU 137, the charging/flash control section 138 controls current supply to the self-timer lamp 105*c* or the AF fill light lamp 105*b* to ensure that a desired flash amount is obtained at a desired timing.

More specifically, when a high (H) level signal is inputted to the charging/flash control section 138 from the main CPU 20 or the photometry/ranging CPU 137, the self-timer lamp 105*c* enters an energized state and turns on. On the other hand, when a low (L) level signal is inputted to the charging/flash control section 138, the self-timer lamp 105*c* enters a non-energized state and turns off.

The main CPU 20 or the photometry/ranging CPU 137 varies the luminance (brightness) of the self-timer lamp 105*c* by setting varying ratios of output periods of the H and L level signals (duty ratio).

The self-timer lamp 105*c* may be composed of a LED. Alternatively, the self-timer lamp 105*c* and the AF fill light lamp 105*b* may share the same LED.

The self-timer circuit 83 is connected to the main CPU 20. When the mode is set to self-photographing mode, the main CPU 20 performs clocking based on a fully-pressed signal of the release switch 104. During clocking, the main CPU 20 controls the self-timer lamp 105*c* via the photometry/ranging CPU 137 to blink so that its blinking progressively becomes faster according to the remaining time. Upon conclusion of clocking, the self-timer circuit 83 inputs a clocking conclusion signal to the main CPU 20. Based on the clocking conclusion signal, the main CPU 20 causes the CCD 132 to perform a shutter operation.

A communication port 107 is provided at the communication control section 139. The communication control section 139 is responsible for data communication with external devices, such as a personal computer with an USB terminal, by outputting image signals of a subject photographed by the camera 100 to such external devices and inputting image signals from such external devices to the camera 100. The camera 100 is also provided with a function which simulates the functions of conventional cameras that perform photography onto rolls of photographic film which enable such conventional cameras to switch among ISO sensitivities such as 100, 200, 400 and 1600. When ISO sensitivity is switched to 400 or higher, the camera 100 assumes a high sensitivity mode where the amplification factor of the amplifier of the white-balance/gamma processing section 133 is set to a high amplification factor which exceeds a predetermined amplification factor. During photographing under the high sensitivity mode, the communication control section 139 discontinues communication with external devices.

The camera 100 is also provided with a compression/expansion/ID extracting section 143 and an I/F section 144. The compression/expansion/ID extracting section 143 reads out image data stored in the buffer memory 135 via a bus line 142 and compresses the image data, and stores the image data into a memory card 200 via the I/F section 144. In addition, when reading out image data stored in the memory card 200, the compression/expansion/ID extracting section 143 extracts an identification number (ID) unique to the memory card 200, reads out image data stored in the memory card 200 and expands the image data, and stores the image data into the buffer memory 135.

Y/C signals stored in the buffer memory 135 are compressed by the compression/expansion/ID extracting section 143 into a predetermined format, and are then recorded to a removable media such as the memory card 200 or a built-in high-capacity storage media such as a hard disk (HDD) 75 via the I/F section 144 in a predetermined format (e.g. Exif (Exchangeable Image File Format) file). Recording of data to the hard disk (HDD) 75 or reading of data from the hard disk (HDD) 75 is controlled by a hard disk controller 74 in response to instructions from the main CPU 20.

The camera 100 is also provided with the main CPU 20, an EEPROM 146, a YC/RGB conversion section 147, and a display driver 148. The main CPU 20 provides overall control of the camera 100. Data unique to each product of the camera 100 and programs are stored in the EEPROM 146. The YC/RGB conversion section 147 converts color image signals generated at the YC processing section 140 into trichromatic RGB signals, and outputs the converted signals to the image displaying LCD 102 via the display driver 148.

The camera 100 is configured so that an AC adapter 48 for obtaining power from an AC power source and the power battery 68 are both detachable. The power battery 68 is composed of a chargeable secondary battery such as a NiCD battery, a nickel hydride battery or a lithium-ion battery. The power battery 68 may also be composed of a disposable primary battery such as a lithium battery or an alkaline battery. By loading the power battery 68 into a battery storage compartment, not shown, the power battery 68 is electrically connected to the various circuits of the camera 100.

When the AC adapter 48 is loaded onto the camera 100 and power is supplied from an AC source to the camera 100 via the AC adapter 48, the power outputted from the AC adapter 48 is preferentially supplied to the various sections of the camera 100 as driving power even when the power battery 68 is loaded in the battery storage compartment. Meanwhile, when the AC adapter 48 is not loaded but the power battery 68 is, power outputted from the power battery 68 is supplied to the various sections of the camera 100 as driving power.

Incidentally, although not shown, the camera 100 is provided with a backup battery that is separate from the power battery 68 to be loaded into the battery storage compartment. For instance, a dedicated secondary battery is used for the internal backup battery, and is charged by the power battery 68. The backup battery supplies power to the basic functions of the camera 100 when the power battery 68 is not loaded into the battery storage compartment for replacement or removal.

In other words, when power supply from the power battery 68 or the AC adapter 48 is terminated, the backup batter is connected to a RTC 15 or the like by a switching circuit (not shown), and supplies power to these circuits. This ensures that power is supplied without interruption to basic functions such as the RTC 15 or the like unless the backup battery 29 reaches the end of its battery life.

The RTC (Real Time Clock) 15 is a dedicated chip for clocking, and remains in continuous operation by receiving power from the backup battery even when power supply from the power battery 68 or the AC adapter 48 has been cut off.

A backlight 70 which illuminates a transmissive or semitransmissive liquid crystal panel 71 from its rear face-side is provided on the image display LCD 102. During power saving mode, the main CPU 20 controls the brightness (luminance) of the backlight 70 via a backlight driver 72, thereby reducing power consumed by the backlight 70. In addition, the power saving mode can be turned on and off by performing a predetermined operation on a menu screen which is displayed on the image display LCD 102 by pressing the information position specifying key 126 of the operation section 120.

Figure 4:
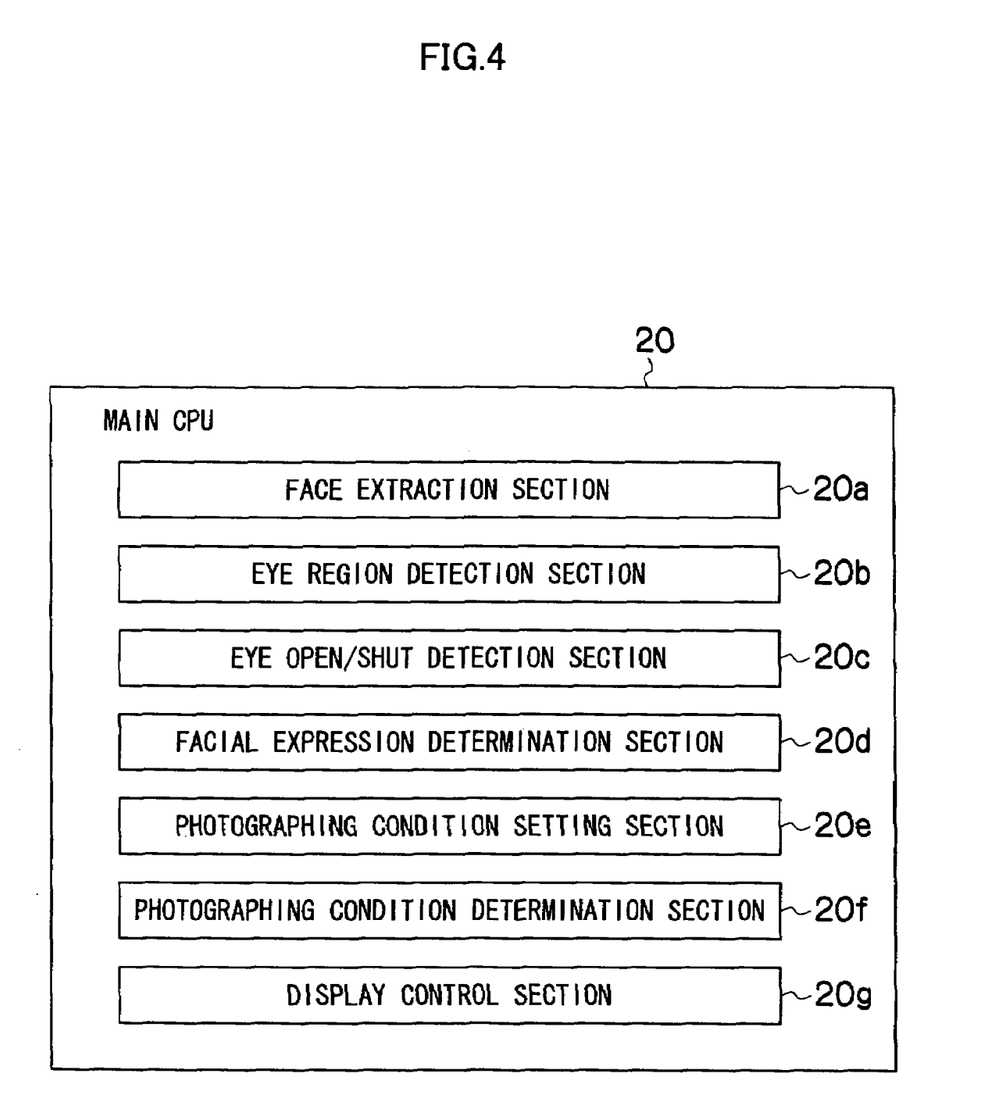
FIG. 4 is a diagram conceptually illustrating a program executed by a main CPU.

FIG. 4 is a diagram conceptually illustrating a program executed by the main CPU 20. The main CPU 20 reads out: a face extraction section 20a; an eye region detection section 20b; an eye open/shut detection section 20c; a facial expression determination section 20d; a photographing condition setting section 20e; a photographing condition determination section 20f; and a display control section 20g; which are programs stored in a computer readable storage media such as the EEPROM 146 or the hard disk 75, to a RAM 145 or the like and executes the programs. These programs may also be referred to as simply "program".

The face extraction section 20a extracts facial regions, which are regions that include facial portions of individuals, from images that are sequentially stored in the buffer memory 135 (these images may be hereinafter referred to as "original images"). As for the method for extracting facial regions, for instance, a technique disclosed in Japanese Patent Application Laid-Open No. 09-101579 "Facial Region Extraction Method and Copying Condition Determination Method" by the present inventor may be applied.

This technique determines whether the hue of each pixel of a photographed image falls in a skin color range in order to divide the image into a skin-colored region and a non-skin-colored region, and detects edges in the image in order to classify each location in the image to either edge portions or non-edge portions. A region within a skin-colored region comprising pixels classified as non-edge portions and surrounded by pixels determined to be edge portions is extracted as a face candidate region. The extracted face candidate region is determined whether it corresponds to a face of a person, and is then extracted as a facial region based on the determination results. Alternatively, facial regions may be extracted using methods described in Japanese Patent Application Laid-Open No. 2003-209683 or Japanese Patent Application Laid-Open No. 2002-199221.

In the following description, images of facial regions extracted from original images by the face extraction portion 20a will be referred to as "extracted facial images".

The eye region detection section 20b detects eye regions in which eyes exist from facial regions extracted from the original images by the face extraction portion 20a. Eye regions may be detected from relative positional relationships at central locations of facial outlines which are obtained as result of face detection.

The eye open/shut detection section 20c determines whether eyes in a eye region are opened or shut, or whether they are completely opened or only half-opened. The method for determining whether eyes are open or shut is not limited to any particular method. For instance, the eye open/shut detection section 20c respectively detects numbers of black pixels in vertical directions in two eye regions which correspond to both eyes. Based on the numbers of black pixels in vertical directions in the two eye regions, determination is performed on whether both eyes are open or shut, or only halfway open.

The facial expression determination section 20d determines whether the extracted facial image features a particular facial expression (for instance, any one of delight, anger, sorrow and pleasure). As a specific method, for instance, a method described in Japanese Patent Application Laid-Open No. 2001-51338 may be applied.

The display control section 20g sends, to an OSD signal generating circuit 148a built into the driver 148, a command which causes the OSD signal generating circuit 148a to generate signals for displaying textual and symbolic information such as shutter speed or aperture value, remaining image capacity, date and time of photographing, alarm messages, and a graphical user interface (GUI). As needed, signals outputted from the OSD signal generating circuit 148a are mixed with image signals from the YC/RGB conversion section 147, and supplied to the liquid crystal panel 71. This enables displaying of composite images with texts and the like composited onto live views or playback images.

Figure 5:
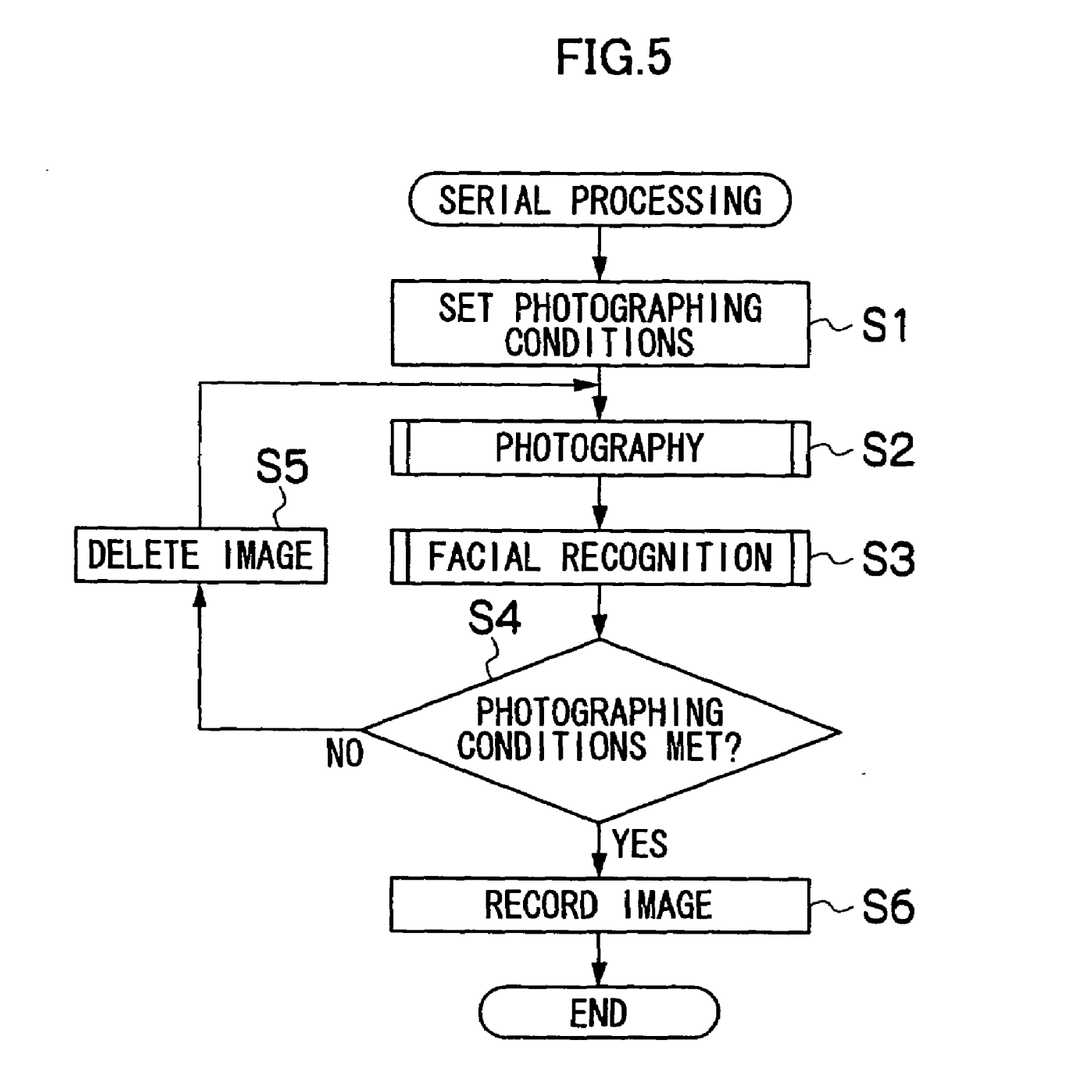
FIG. 5 is a flowchart showing a flow of automatic image recording processing according to a first embodiment.

A flow of automatic image recording processing performed by the camera 100 will now be described with reference to the flowchart of FIG. 5. This processing is performed when the subject is a single person. The processing may be arbitrarily initiated or terminated by operating the operation section 120.

Figure 6:
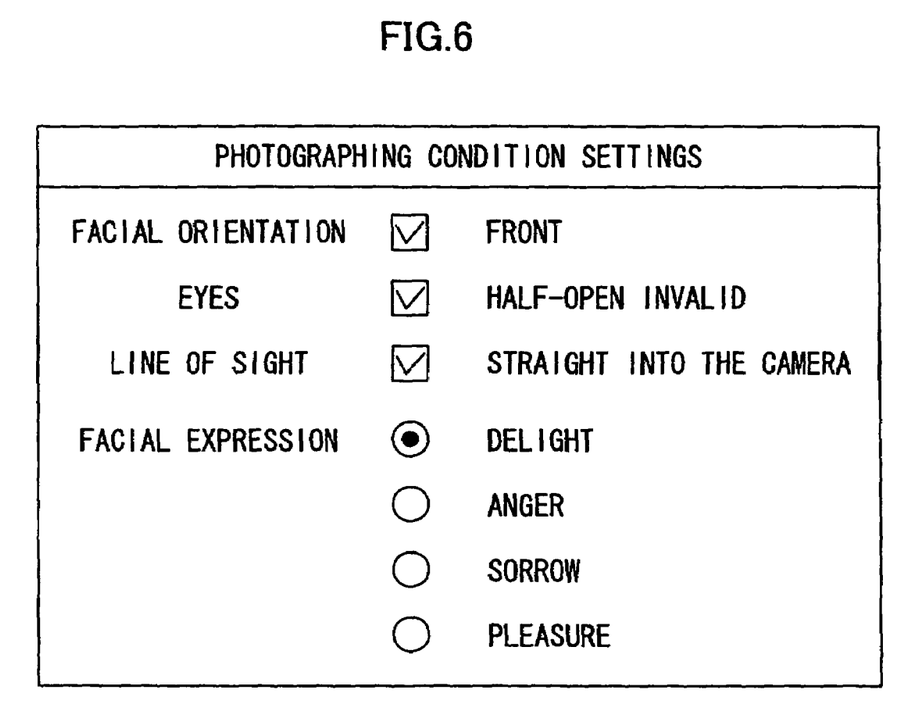
FIG. 6 is a display example of a photographing condition setting screen.

In step S1, the photographing condition setting section 20e sets desired photographing conditions through operation of the operation section 120. For instance, a command of the display control section 20g may cause a GUI as shown in FIG. 6 to be displayed on the liquid crystal panel 71 to have the user arbitrarily select whether "facial orientation", "eyes" opened or shut, "line of sight" and "facial expression" will be set as photographing conditions by operating the operation section 120. The photographing condition setting section 20e stores the set photographing conditions into the RAM 145.

In step S2, an image for recording is obtained in response to the release switch 104 being fully pressed. The obtained image data is converted into a Y/C signal, and is stored in the buffer memory 135 after receiving predetermined processing such as gamma correction and the like.

In step S3, the face extraction section 20a, the eye region detection section 20b, the eye open/shut detection section 20c and the facial expression determination section 20d respectively perform facial image extraction, eye region detection, detection of whether eyes are open or shut, and determination of facial expression. The processing of these programs is collectively referred to as "facial recognition". Results of the facial recognition are stored as facial recognition information in the RAM 145.

In step S4, the photographing condition determination section 20f references the facial recognition information and the photographing conditions stored in the RAM 145, and determines whether the image for recording meets the set photographing conditions. If the photographing condition determination section 20f determines that the image for recording meets the photographing conditions, the processing proceeds to step S6. If not, the processing proceeds to step S5.

Determination of whether the image for recording meets the photographing conditions is performed as follows. For instance, if the "front" box of "facial orientation" in the GUI shown in FIG. 6 has been checked, the photographing condition determination section 20f determines whether the face of the extracted facial image is oriented towards the front. If the face of the extracted facial image is oriented towards the front, the photographing condition determination section 20f determines that the photographing condition of "facial orientation" has been met. If the face of the extracted facial image is not oriented towards the front, the photographing condition determination section 20f determines that the photographing condition of "facial orientation" has not been met.

Alternatively, if the "half-open invalid" box of "eyes" in the GUI shown in FIG. 6 has been checked, the photographing condition determination section 20f determines that the photographing condition of "eyes" have not been met when the eye open/shut detection section 20c has determined that the eyes are either "shut" or "half open". In addition, when the eye open/shut detection section 20c has determined that the eyes are neither "shut" nor "half open", the photographing condition determination section 20f determines that the photographing condition of "eyes" have been met.

Alternatively, if the "straight into the camera" box of "line of sight" in the GUI shown in FIG. 6 has been checked, the photographing condition determination section 20f determines whether the line of sight of the extracted facial image is directed straight towards the camera. If the subject is looking straight into the camera, it is determined that the photographing condition of "line of sight" has been met. If not, it is determined that the photographing condition of "line of sight" has not been met.

Alternatively, if any of the buttons "delight", "anger", "sorrow" or "pleasure" have been set in the GUI of FIG. 6, the photographing condition determination section 20f determines whether the facial expression of the extracted facial image coincides with whichever of the facial expressions "delight", "anger", "sorrow" and "pleasure" correspond to the set button. The photographing condition determination section 20f determines that the photographing condition of "facial expression" has been met when the facial expression coincides with the facial expression corresponding to the set button. If not, the photographing condition determination section 20f determines that the photographing condition of "facial expression" has not been met.

When the image to be recorded is determined as meeting all of the photographing conditions described above, the photographing condition determination section 20f determines that the photographing conditions have been met, and the processing proceeds to step S6. If any of the photographing conditions have not been met, the photographing condition determination section 20f determines that the photographing conditions have not been met, and the processing proceeds to step S5.

Alternatively, the photographing condition determination section 20f may be arranged so as to determine that the photographing conditions have been met when the image to be recorded is determined to meet any of the photographing conditions described above, in which event the processing proceeds to step S6, and to determine that the photographing conditions have not been met when the image to be recorded is determined to meet none of the photographing conditions described above, in which event the processing proceeds to step S5.

In step S5, the main CPU 20 erases images to be recorded that have been determined not to meet the photographing conditions from the buffer memory 135, and the processing returns to step S2 to continue acquisition of images for recording. However, the second and subsequent attempts to acquire an image for recording are carried out automatically, regardless of whether the release switch 104 is fully pressed. At this time, a message to the effect that the image data does not meet the photographing conditions may be displayed on the liquid crystal panel 71, or an audible alarm may be played back by a speaker, not shown.

In addition, the processing may be arranged so that an audible alarm is played back by the speaker, not shown, and image acquisition in step S2 is discontinued when no images that are determined to meet the photographing conditions have been acquired after a lapse of a predetermined period of time (for instance, 5 minutes), or when no images that are determined to meet the photographing conditions are obtained after step S2 is iterated a predetermined number of times (for instance, 20 times).

In step S6, recording of an image for recording that has been determined to meet the photographing conditions is performed. In other words, Y/C signals stored in the buffer memory 135 is recorded onto the memory card 200 or the hard disk (HDD) 75 in a predetermined format. The recorded image may be displayed on the liquid crystal 71 as a "finalized image". Alternatively, a message to the effect that image data meeting the photographing conditions has been obtained may be displayed on the liquid crystal panel 71, or an audible alarm may be played back by the speaker.

As seen, images that meet desired photographing conditions may be reliably acquired by determining whether sequentially obtained image data meet photographing conditions, and according to the determination results, either recording the images or deleting the images and continuing photographing.

The above automatic image recording processing may be applied to a wide variety of uses. As an example, consider a case where photography is performed with a baby as the subject. Babies seldom face the front. Therefore, desired images have been conventionally obtained by repeating such operations as: pressing a release switch and verifying the photographed image; deleting an unsuccessful image; and recommencing photographing. Such iterations of operations were not only troublesome, but often prevented the photographer from taking advantage of photographic opportunities if they arrived during image verification or deletion.

In this light, by using the camera 100 according to the present invention to preset photographing conditions such as "front" and "straight into the camera", photographing is repeated until an image data meeting the photographing conditions is obtained. Therefore, there is no more need to repeat troublesome processes as was conventionally required, and desired images may be reliably obtained.

Second Embodiment

Among the various steps of the automatic image recording processing according to the first embodiment, while the steps of iteration of photographing operations and determination of photographing conditions were serially performed, these steps may alternatively be performed in parallel.

Figure 7:
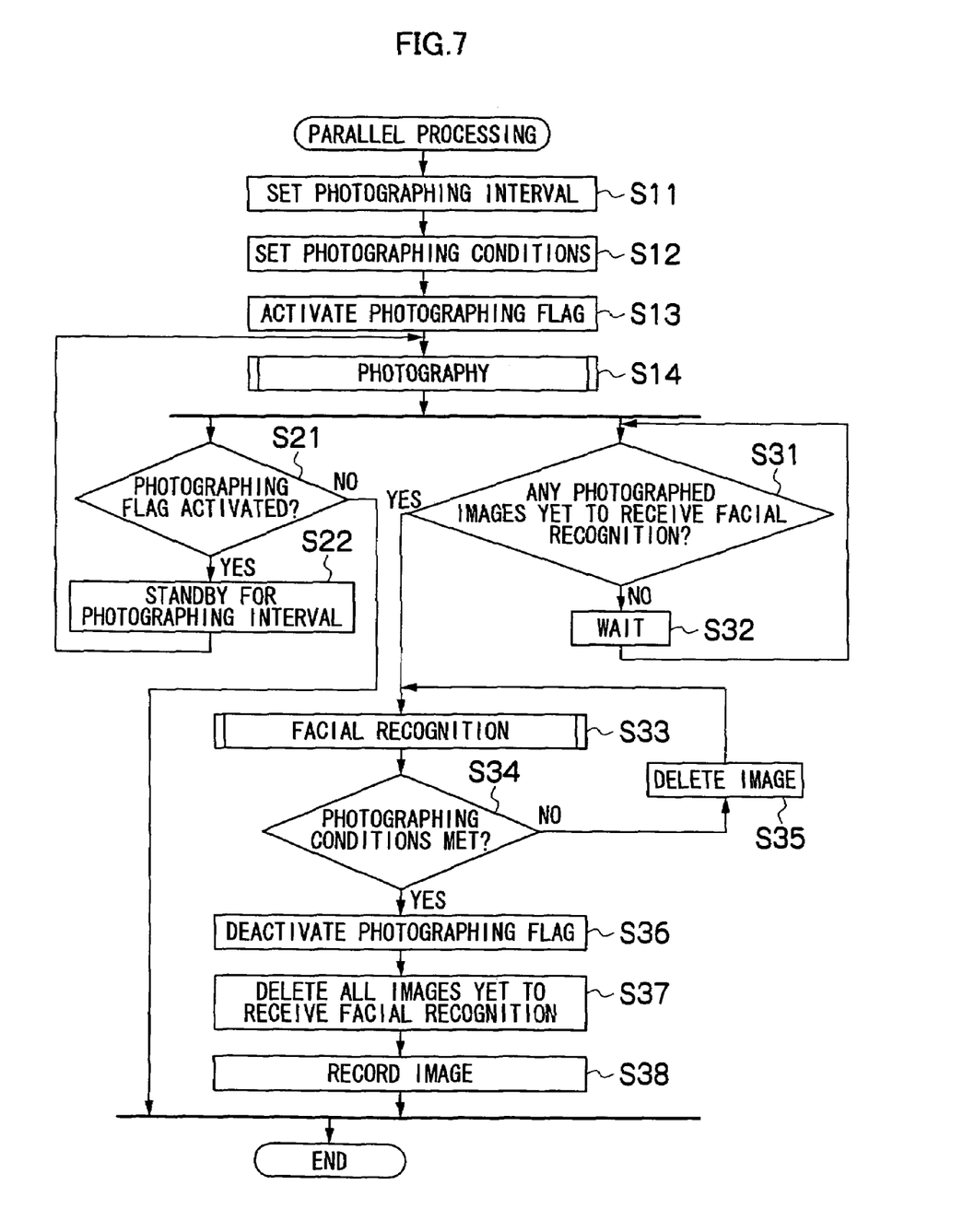
FIG. 7 is a flowchart showing a flow of automatic image recording processing according to a second embodiment.

FIG. 7 is a flowchart illustrating a flow of automatic image recording processing according to a second embodiment.

In step S11, setting of a desired photographing interval is accepted through an operation of the operation device 120. The set photographing interval will be used in step S22, described later. The photographing interval may be set to, for instance, 3 seconds or 5 seconds and the like.

In step S12, desired photographing conditions are set. This process is the same as the process in step S1.

In step S13, setting of activation/de-activation of a photographing flag is accepted through an operation of the operation device 120. Activation/de-activation of the photographing flag sets whether the loop process of steps S14, S21 and S22 in the automatic image recording processing is iterated. If a user desires to perform iterative photographing, the photographing flag should be set to activation. If not, the photographing flag should be set to de-activation.

However, activation/de-activation of the photographing flag may also be set in step S36, described later, and is not limited to setting through operation of the operation section 120.

In step S14, an image for recording is acquired in the same way as in step S2.

It is assumed that the subsequent processes of steps S21 and S22 will be performed concurrently with the processing of steps S31 to S38.

In step S21, the processing determines whether the photographing flag is activated. If the photographing flag is activated, the processing proceeds to step S22. If not, processing is terminated.

In step S22, a lapse of a set photographing interval (S11) is clocked from the moment image acquisition is concluded (S14). Once the photographing interval has lapsed, the processing returns to S14 to re-perform image acquisition.

In step S31, images for recording which are stored in the buffer memory 135 is referenced to determine whether there are images for recording that have not yet undergone facial recognition. If there are no images for recording that have not yet received facial recognition, the processing proceeds to step S32 to await acquisition of new images for recording.

Incidentally, the processing may be terminated without waiting for acquisition of new images for recording when it is assumed that the subject has changed, for instance in the case where the orientation of the camera 100 has been altered.

In step S33, facial recognition is performed on images for recording which have not yet received facial recognition.

In step S34, the processing determines whether an extracted facial image meets photographing conditions. This determination is the same as that in step S4. If the photographing conditions are met, the processing proceeds to S36, and if not, the processing proceeds to S35.

In step S35, images for recording not meeting photographing conditions are deleted.

In step S36, the photographing flag is deactivated. Iteration of image acquisition (S14) is thereby terminated.

In step S37, all images that have not received facial recognition are deleted. This is performed because, although depending on the timing of image acquisition (S14), image acquisition may be re-performed after the determination in step S34, resulting in new images for recording that have not yet been determined by the step S31 being stored, determination of whether such new images meet photographing conditions is impractical provided that the existence of an image meeting the photographing conditions has already been confirmed. However, since it is conceivable that not all such new images are unnecessary, the processing may be arranged so that the user can arbitrarily set whether the process of the present step is performed.

In step S38, images for recording that meet the photographing conditions are recorded. This process is the same as the process in step S6. However, unlike the first embodiment, there may be cases where a plurality of images for recording that meet the photographing conditions exist. In such cases, the images may all be recorded, or the present embodiment may be arranged to accept selection by the user of images to be recorded among the images for recording that meet the photographing conditions through the operation section 120, so that only the selected images are recorded.

As seen in the present embodiment, by concurrently performing image acquisition and photographing condition determination, the interval of iterative image acquisition may be shortened arbitrarily to further reduce the possibility of missing ideal shutter moments, provided that the load on the CPU 20 is disregarded.

Third Embodiment

The first and second embodiments assumed that the subject was a single person. However, it is possible to perform determination of whether facial recognition is performed and photographing conditions are met on a particular subject among a plurality of subjects.

In order to do so, information identifying each subject is first registered into the HDD 75 or the like.

Figure 8:
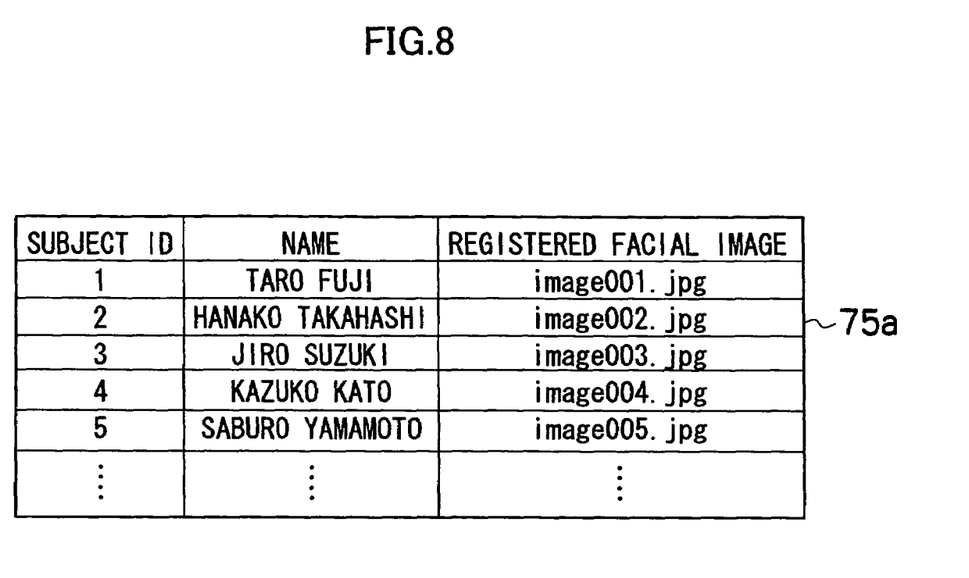
FIG. 8 is an explanatory diagram of a concept of a basic information registration table.

Referring now to FIG. 8, a basic information registration table 75a is stored in the HDD 75. The basic information registration table 75a relates "registration facial images", which are images to be used as criteria for identifying the face of each individual subject, to "subject IDs", which are unique information assigned to each individual subject. The "registration facial images" and "subject IDs" are further related to "names" of individuals. A string of information in which a "subject ID", a "registration facial image" and a "name" are related to each other is herein referred to as basic information.

Registration facial images are acquired by a photographer using the camera 100 by individually photographing the face of each subject. Alternatively, registration facial images may be inputted to the HDD 75 from various electronic devices such as an external server or a camera via the communication port 107. Registration facial images may otherwise be read out from the memory card 200.

Stored contents of the basic information registration table 75a may be displayed on the liquid crystal panel 71 by performing predetermined menu operations. The stored contents may also be added, changed, deleted or updated.

Although the basic information registration table 75a may be registered at any time, such registration is preferably performed before the execution of automatic image recording processing.

The basic information registration table 75a does not necessarily have to be accumulated in an internal storage media of the camera 100, and can be stored in an external server or the like to be accessed as needed via the communication port 107.

In addition, a program for identifying and managing each subject is provided.

Figure 9:
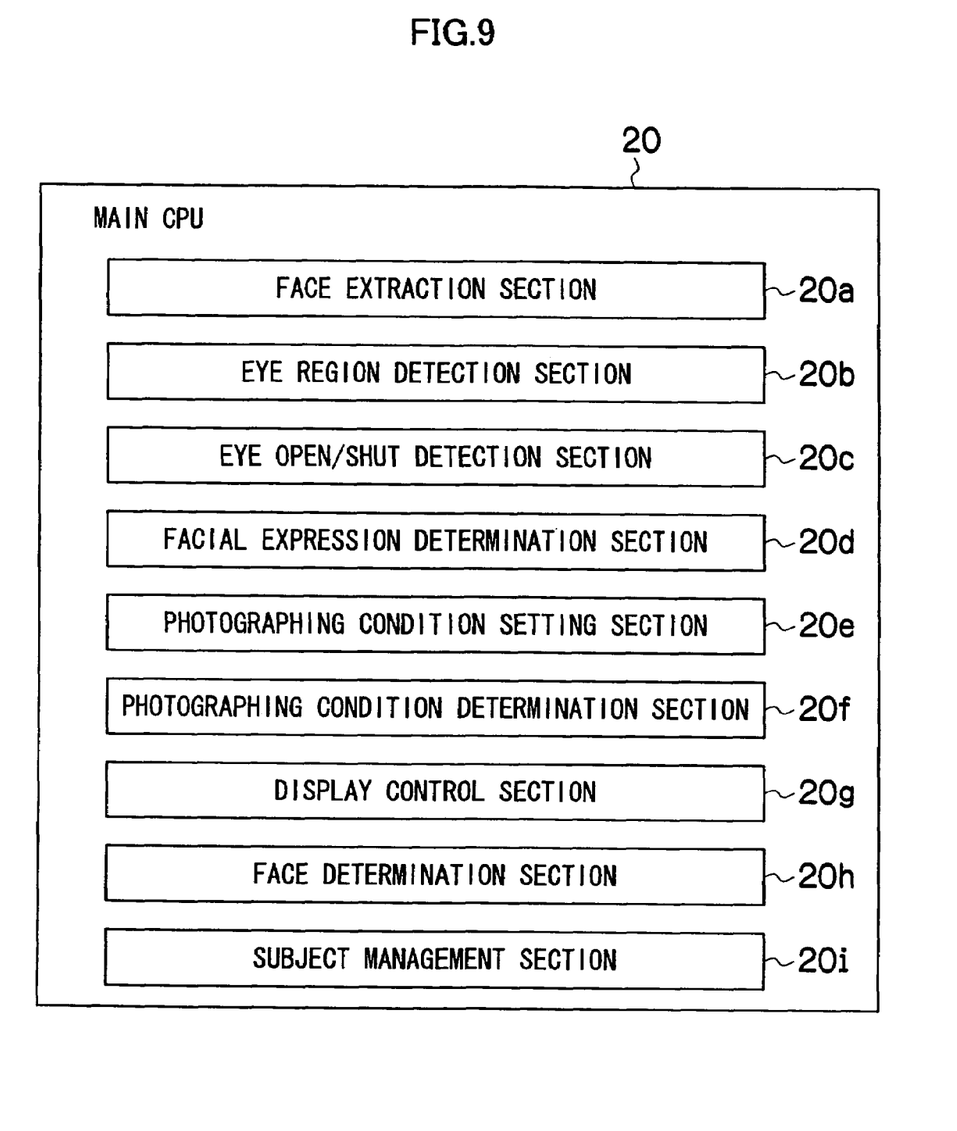
FIG. 9 is a diagram conceptually illustrating a program executed by a main CPU.

Referring now to FIG. 9, the CPU 20 executes a facial determination section 20h and a subject management section 20i, which are both programs. The facial determination section 20h identifies a extracted facial image which match a pre-selected registration facial image from those extracted by the face extraction section 20a, and identifies the subject ID corresponding to the identified registration facial image. Various facial recognition techniques may be used to determine matches between registration facial images and extracted facial images. For instance, matches may be determined based on face sizes, face contours, eye positions or the like.

Alternatively, when subject positions are respectively defined for the subjects, such as in group photographs, relationships between positions of extracted facial images, subject IDs and registration facial images may be prescribed in the basic information registration table 75a, and the facial determination section 20h may identify subject IDs and registration facial images according to the positions of extracted facial images.

The subject management section 20i manages adding, changing, deleting and updating of contents stored in the basic information registration table 75a for each facial image.

Figure 10:
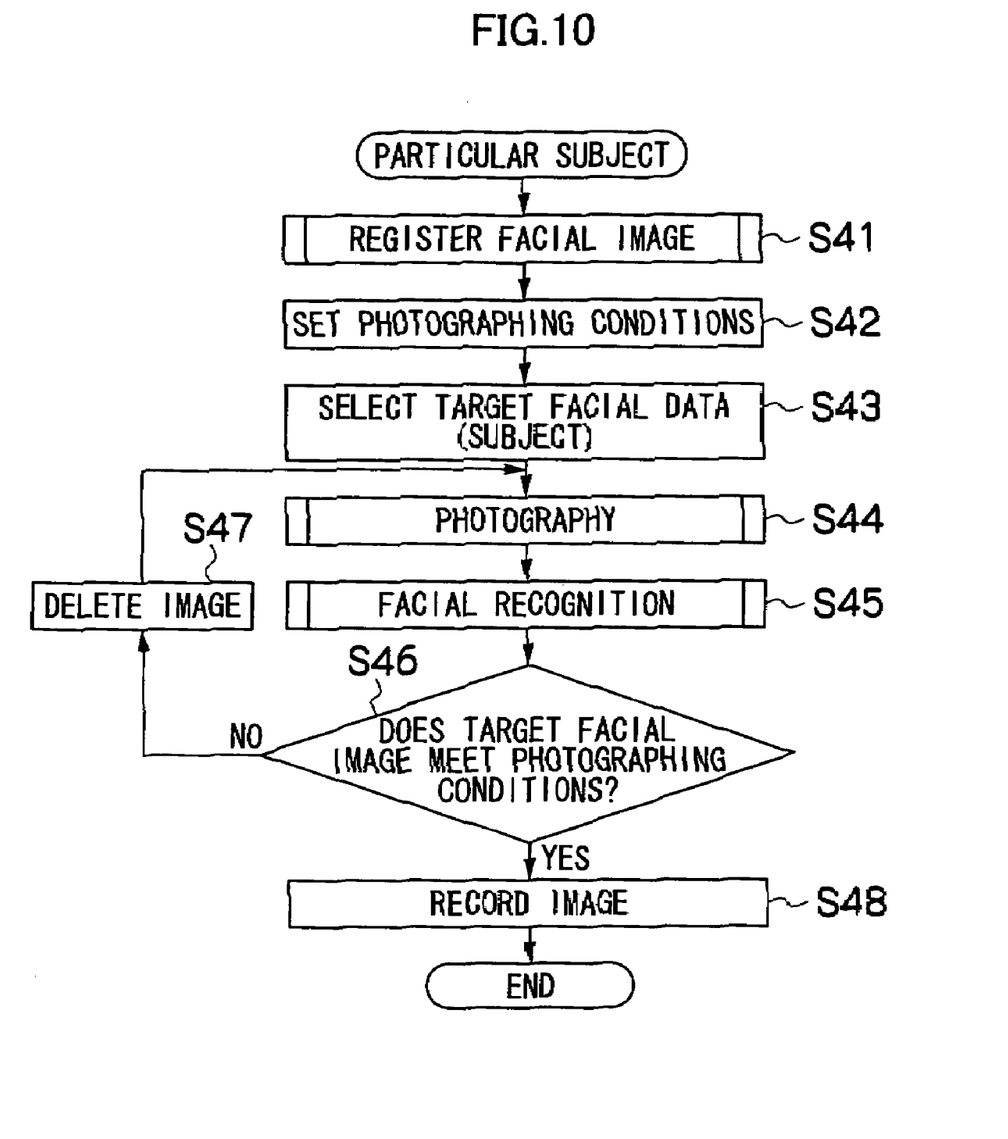
FIG. 10 is a flowchart showing a flow of automatic image recording processing according to a third embodiment.

FIG. 10 is a flowchart illustrating a flow of automatic image recording processing according to a third embodiment.

First, in step S41, a photographer who intends to photograph one or a plurality of subjects specified in advance sets the switching lever 122 to "photograph", and individually photographs the face of each subject. For this purpose, it is preferable that the faces are photographed at clear and appropriate sizes to allow extraction of the facial regions by the face extraction section 20a.

In addition, since the facial orientation and the facial expression of a subject may change diversely, determination of photographing conditions may prove to be difficult when referencing only one registration facial image. To this end, a plurality of facial orientations and a plurality of facial expressions are to be registered in relation to a subject ID of the same individual to enable accurate determination of whether arbitrarily set photographing conditions are met.

Each photographed facial image is displayed on the liquid crystal panel 71. The subject management section 20i accepts input of the "names" of subjects via a graphical user interface (GUI), not shown, which is displayed on the liquid crystal panel 71.

Next, after confirming whether a photographed facial image (the facial image may otherwise be imported from an external device) should be registered in the basic information registration table 75a, when a designation for registration is forwarded from the operation section 120, the subject management section 20i attaches a unique subject ID to the photographed facial image, relates the facial image and the subject ID with a name inputted through the operation section 120, and stores the related information into the basic information registration table 75a.

In step S42, setting of photographing conditions is accepted. This process is the same as the process in step S1.

In step S43, selection of a subject to receive facial recognition is enabled through operation of the operation section 120. More specifically, a list of "names" stored in the basic information registration table 75a is displayed on the GUI, and by allowing a desired name to be selected from the list, selection of a registration facial image corresponding to the selected name is achieved. If the position of the subject is defined, by allowing the position (for instance, a central section) to be specified, selection of a registration facial image corresponding to the specified position is achieved.

In step S44, an image for recording is acquired.

In step S45, facial recognition is performed.

In step S46, the facial determination section 20h identifies an extracted facial image which matches the registration facial image selected in step S43. Then, the facial determination section 20h determines whether the identified extracted facial image meets the photographing conditions. Determination of whether the photographing conditions are met is performed in the same way as in step S4. If the identified extracted facial image meets the photographing conditions, the processing proceeds to S48. If not, the processing proceeds to S47.

In step S47, extracted images for recording for the extracted facial images not meeting photographing conditions are deleted. Then, the processing returns to step S44 to resume image acquisition.

In step S48, the recorded image may be displayed on the liquid crystal 71 as a "finalized image". In addition, a "name" corresponding to the registration facial image selected in step S43, or a message to the effect that an image meeting the photographing conditions has been acquired may also be displayed.

In this processing, photographing may be iterated until a particular subject among the plurality of subjects meets the photographing conditions. For instance, in a case where there is a plurality of babies, when a photographer desires to perform photographing while featuring his or her own baby, the photographer should first register a facial image of the baby in the basic information registration table 75a, and then select the baby as a particular subject.

Other Embodiments

Instead of executing the programs of the face extraction section 20a, the eye region detection section 20b, the eye open/shut detection section 20c, the facial expression determination section 20d, the photographing condition setting section 20e, the photographing condition determination section 20f, the display control section 20g, the facial determination section 20h, and the subject management section 20i through the CPU 20, a variation configured so that either a portion of or all of the above programs are implemented in a dedicated semiconductor integrated circuit (ASIC or Application Specific Integrated Circuit) is also possible. This variation is preferable, since it reduces the load on the main CPU 20.

What is claimed is:

1. An image pickup apparatus, comprising:
   an image pickup element which receives subject light incident via a photographing lens, converts the subject light into a picked-up image signal, and outputs the image signal;
   an image data conversion section which converts the picked-up image signal outputted from the image pickup element into image data and outputs the image data;
   a storage section which temporarily stores at least the image data outputted by the image data conversion section;
   a recording section which records the image data stored in the storage section;
   a photographing condition setting section which sets photographing conditions of a subject;
   a photographing condition determination section which determines whether the image data in the storage section meet the photographing conditions set by the photographing condition setting section; and
   a photographing control section which deletes from the storage section image data determined by the photographing condition determination section not to meet the photographing conditions, and records into the recording section image data determined by the photographing condition determination section to meet the photographing conditions,
   wherein the photographing control section causes, until the photographing condition determination section determines that any of the image data stored in the storage section meets the photographing conditions, the image pickup element to re-execute output of picked-up image signals, the image data conversion section to re-execute conversion of the picked-up image signals into image data and output of the image data, and the storage section to re-execute storing of the image data.

2. The image pickup apparatus according to claim 1, further comprising an interval setting section which sets a desired time interval,
   wherein the photographing control section causes, for each desired time interval set by the interval setting section, the image pickup element to re-execute output of picked-up image signals, the image data conversion section to re-execute conversion of the picked-up image signals into image data and output of the image data, and the storage section to re-execute storing of the image data.

3. The image pickup apparatus according to claim 2, wherein the photographing control section deletes from the storage section image data not yet determined by the photographing condition determination section as to whether they meet the photographing conditions in response to the determination by the photographing condition determination section that any of the image data stored in the storage section meets the photographing conditions.

4. The image pickup apparatus according to claim 2, further comprising a display section which displays image data determined by the photographing condition determination section to meet photographing conditions.

5. The image pickup apparatus according to claim 2, wherein the photographing conditions include the orientation of the face of the subject, whether eyes are open or closed, and line of sight or facial expression of the subject.

6. The image pickup apparatus according to claim 3, further comprising:
   an identification information storage section which stores identification information of subjects; and
   an identification information selecting section which accepts selection of identification information of a desired subject,
   wherein the photographing condition determination section determines whether any image data in the storage section meets the photographing conditions of a subject identified by desired identification information that is selected by the identification information selecting section.

7. The image pickup apparatus according to claim 3, further comprising a display section which displays image data determined by the photographing condition determination section to meet photographing conditions.

8. The image pickup apparatus according to claim 3, wherein the photographing conditions include the orientation of the face of the subject, whether eyes are open or closed, and line of sight or facial expression of the subject.

9. The image pickup apparatus according to claim 6, wherein the identification information of a subject includes image data that is used as criterion for identifying the face of the subject.

10. The image pickup apparatus according to claim 6, further comprising a display section which displays image data determined by the photographing condition determination section to meet photographing conditions.

11. The image pickup apparatus according to claim 6, wherein the photographing conditions include the orientation of the face of the subject, whether eyes are open or closed, and line of sight or facial expression of the subject.

12. The image pickup apparatus according to claim 9, further comprising a registration section which stores desired image data among the image data stored in the storage section as subject identification information in the identification information storage section.

13. The image pickup apparatus according to claim 9, further comprising a display section which displays image data determined by the photographing condition determination section to meet photographing conditions.

14. The image pickup apparatus according to claim 9, wherein the photographing conditions include the orientation of the face of the subject, whether eyes are open or closed, and line of sight or facial expression of the subject.

15. The image pickup apparatus according to claim 12, further comprising a display section which displays image data determined by the photographing condition determination section to meet photographing conditions.

16. The image pickup apparatus according to claim 15, wherein the photographing conditions include the orientation of the face of the subject, whether eyes are open or closed, and line of sight or facial expression of the subject.

17. The image pickup apparatus according to claim 12, wherein the photographing conditions include the orientation of the face of the subject, whether eyes are open or closed, and line of sight or facial expression of the subject.

18. The image pickup apparatus according to claim 1, wherein the photographing control section deletes from the storage section image data not yet determined by the photographing condition determination section as to whether they meet the photographing conditions in response to the determination by the photographing condition determination section that any of the image data stored in the storage section meets the photographing conditions.

19. The image pickup apparatus according to claim 1, further comprising:
an identification information storage section which stores identification information of subjects; and
an identification information selecting section which accepts selection of identification information of a desired subject,
wherein the photographing condition determination section determines whether any image data in the storage section meets the photographing conditions of a subject identified by desired identification information that is selected by the identification information selecting section.

20. The image pickup apparatus according to claim 19, wherein the identification information of a subject includes image data that is used as criterion for identifying the face of the subject.

21. The image pickup apparatus according to claim 20, further comprising a registration section which stores desired image data among the image data stored in the storage section as subject identification information in the identification information storage section.

22. The image pickup apparatus according to claim 1, further comprising a display section which displays image data determined by the photographing condition determination section to meet photographing conditions.

23. The image pickup apparatus according to claim 1, wherein the photographing conditions include the orientation of the face of the subject, whether eyes are open or closed, and line of sight or facial expression of the subject.

24. An image pickup method used in an image pickup apparatus comprising an image pickup element which receives subject light incident via a photographing lens and converts the subject light into a picked-up image signal and outputs the image signal, a image data conversion section which converts the picked-up image signal outputted from the image pickup element into image data and outputs the image data, a storage section which temporarily stores at least the image data outputted by the image data conversion section, and a recording section which records the image data stored in the storage section, the image pickup method comprising:
setting photographing conditions of a subject;
determining whether the image data of the storage section meet the set photographing conditions;
deleting image data determined not to meet the photographing conditions from the storage section;
recording image data determined to meet the photographing conditions into the recording section; and
re-executing, until one any of the image data stored in the storage section is determined to meet the photographing conditions, outputting of picked-up image signals, conversion of the picked-up image signals into image data and output of the image data, and storing of the image data.

25. An image pickup method for use in a processor of an image pickup apparatus, said image pickup apparatus comprising an image pickup element which receives subject light incident via a photographing lens and converts the subject light into a picked-up image signal and outputs the image signal, an image data conversion section which converts the picked-up image signal outputted from the image pickup element into image data and outputs the image data, a storage section which temporarily stores at least the image data outputted by the image data conversion section, a recording section which records the image data stored in the storage section; and a processing unit, said method comnrising:
setting photographing conditions of a subject,
determining whether the image data of the storage section meet the set photographing conditions;
deleting image data determined not to meet the photographing conditions from the storage section;
recording image data determined to meet the photographing conditions into the recording section; and
re-executing, until any of the image data stored in the storage section is determined to meet the photographing conditions, outputting of picked-up image signals, conversion of the picked-up image signals into image data and output of the image data, and storing of the image data.

* * * * *